United States Patent
Kim et al.

(10) Patent No.: US 11,590,801 B2
(45) Date of Patent: Feb. 28, 2023

(54) COMPOSITION FOR NON-PNEUMATIC TIRE SPOKE

(71) Applicants: KUMHO TIRE CO., INC., Gwangju (KR); KOREA ADVANCED INSTITUTE OF SCIENCE AND TECHNOLOGY, Daejeon (KR)

(72) Inventors: Kee Woon Kim, Yongin-si (KR); Gwi Seong Shin, Yongin-si (KR); Chul Woo Kwark, Yongin-si (KR); Soon Wook Hwang, Yongin-si (KR); Bumjoon Kim, Daejeon (KR); Jin-Seong Kim, Daejeon (KR); Joonhyeong Choi, Daejeon (KR); Sung Keun Park, Daegu (KR)

(73) Assignees: Kumho Tire Co., Inc., Gwangju (KR); Korea Advanced Institute of Science and Technology, Daejeon (KR)

( * ) Notice: Subject to any disclaimer, the term of this patent is extended or adjusted under 35 U.S.C. 154(b) by 355 days.

(21) Appl. No.: 16/645,338

(22) PCT Filed: Nov. 7, 2018

(86) PCT No.: PCT/KR2018/013432
§ 371 (c)(1),
(2) Date: Mar. 6, 2020

(87) PCT Pub. No.: WO2019/093747
PCT Pub. Date: May 16, 2019

(65) Prior Publication Data
US 2021/0039438 A1  Feb. 11, 2021

(30) Foreign Application Priority Data
Nov. 8, 2017  (KR) .................. 10-2017-0147955

(51) Int. Cl.
*B60C 7/14* (2006.01)
*C08K 3/36* (2006.01)
(Continued)

(52) U.S. Cl.
CPC .................. *B60C 7/14* (2013.01); *C08K 3/36* (2013.01); *C08K 5/548* (2013.01); *C08L 67/025* (2013.01);
(Continued)

(58) Field of Classification Search
None
See application file for complete search history.

(56) References Cited

U.S. PATENT DOCUMENTS

2010/0032071 A1* 2/2010 Miyazaki ................ C08L 15/00
152/525
2013/0178566 A1* 7/2013 Blume ................ C08K 5/5435
524/114

FOREIGN PATENT DOCUMENTS

JP   2009-263456 A   11/2009
JP   2013-18427 A    1/2013
(Continued)

OTHER PUBLICATIONS

English Machine Translation JP2017007359 (A) obtained at https://worldwide.espacenet.com/publicationDetails/originalDocument?CC=JP&NR=2017007359A&KC=A&FT=D&ND=3&date=20170112&DB=EPODOC&locale=en_EP# (Year: 2017).*
(Continued)

*Primary Examiner* — Arrie L Reuther
(74) *Attorney, Agent, or Firm* — Knobbe Martens Olson & Bear LLP (57) ABSTRACT

The present invention relates to a composition for a non-pneumatic tire spoke. In particular, the non-pneumatic tire spoke prepared from the composition for a non-pneumatic
(Continued)

tire spoke has excellent mechanical properties. A composition for a non-pneumatic tire spoke includes a thermoplastic polyester elastomer, a silane-based interfacial binder, and silica particles. The silica particles have an average particle diameter of 100 to 300 μm.

7 Claims, 6 Drawing Sheets

(51) Int. Cl.
    *C08K 5/548*     (2006.01)
    *C08L 67/02*     (2006.01)

(52) U.S. Cl.
    CPC ........ *B60C 7/146* (2021.08); *C08K 2201/003* (2013.01)

(56) References Cited

FOREIGN PATENT DOCUMENTS

| | | | |
|---|---|---|---|
| JP | 2015-39987 | A | 3/2015 |
| JP | 2016-3265 | A | 1/2016 |
| JP | 2016-199069 | A | 12/2016 |
| JP | 2017-7359 | A | 1/2017 |
| KR | 10-2009-0053011 | A | 5/2009 |
| KR | 10-2012-0052368 | A | 5/2012 |
| WO | 2016-021467 | A1 | 2/2016 |

OTHER PUBLICATIONS

Office Action of Japanese Patent Application No. 2020-522051—8 pages (dated Mar. 23, 2021).
International Search Report of corresponding PCT Application No. PCT/KR2018/013432—5 pages (dated Feb. 15, 2019).
Written opinion of corresponding PCT Application No. PCT/KR2018/013432—5 pages (dated Feb. 15, 2019).

* cited by examiner

COMPOSITION FOR NON-PNEUMATIC TIRE SPOKE

TECHNICAL FIELD

The present invention relates to a composition for a non-pneumatic tire spoke. In particular, the present invention relates to a composition for a non-pneumatic tire spoke having excellent mechanical properties, in which a minimum amount of a filler is uniformly dispersed in a thermoplastic polyester elastomer, and a non-pneumatic tire spoke prepared therefrom.

BACKGROUND ART

Non-pneumatic tires are attracting attention as next-generation tires since their manufacturing process is simple by virtue of their structure and they allow stable driving even when certain parts thereof are damaged. In particular, unlike conventional tires that require continuous pneumatic management, non-pneumatic tires have the advantage of fewer requirements for maintenance and fewer chances of fatal accidents caused by a puncture.

At present, various tire manufacturers all over the world are focusing on the development of non-pneumatic tires. Representative non-pneumatic tires include Air Free Concept of Bridgestone and Tweel of Michelin. Most non-pneumatic tires currently known are made of thermoplastic resins or polyurethane materials, which are considered to be vulnerable to heat generation and to have low durability and form-retainability. Thus, they are commercialized to limited vehicles of military and special purposes. However, it is possible to maximize the utilization and advantages of tires when they are applicable to general passenger vehicles in light of the features of tires. Thus, efforts have been made to develop non-pneumatic tires for high-speed driving.

Non-pneumatic tires for high-speed driving may have various structures. The spoke part thereof plays an important role in maintaining the shape of the tire and absorbing shock. In particular, a spoke is characterized by frequent deformation during driving and heat generation during braking. Thus, the material constituting a spoke must have high compressive fatigue stability and thermal stability. Meanwhile, polyurethane, which is mainly used as a material for conventional non-pneumatic tire spokes, has low mechanical properties with a tensile strength of 41 MPa and a flexural modulus of 48 MPa. This is a level that cannot satisfy the physical properties required for non-pneumatic tire spokes for high-speed driving. Thus, it is demanded that a material having higher mechanical stability be developed.

DISCLOSURE OF INVENTION

Technical Problem

Accordingly, the present inventors have prepared a composite material by mixing a thermoplastic polyester elastomer (TPEE) and various fillers to study a composition showing the most suitable physical properties for non-pneumatic tire spokes. As a result, a composition having high mechanical properties has been prepared by mixing silica particles with a silane-based interfacial binder.

Accordingly, an object of the present invention is to provide a composition suitable for a non-pneumatic tire spoke having excellent mechanical properties, in which a minimum amount of a filler is uniformly dispersed in a thermoplastic polyester elastomer, and a non-pneumatic tire spoke prepared therefrom.

Solution to Problem

In order to solve the above problem, the present invention provides a composition for a non-pneumatic tire spoke, which comprises a thermoplastic polyester elastomer, a silane-based interfacial binder, and silica particles.

In addition, the present invention provides a non-pneumatic tire spoke prepared from the composition for a non-pneumatic tire spoke as described above.

Further, the present invention provides a process for manufacturing a non-pneumatic tire spoke, which comprises mixing a thermoplastic polyester elastomer, a silane-based interfacial binder, and silica particles to prepare a mixture; and molding the mixture.

Advantageous Effects of Invention

The composition for a non-pneumatic tire spoke of the present invention, which comprises a minimum amount of a filler uniformly dispersed in a thermoplastic polyester elastomer, is capable of providing a non-pneumatic tire spoke having excellent mechanical properties.

As a result, the non-pneumatic tire spoke prepared from the composition for a non-pneumatic tire spoke of the present invention is excellent in such mechanical properties as tensile modulus, flexural modulus, and the like.

BEST MODE FOR CARRYING OUT THE INVENTION

The present invention provides a composition for a non-pneumatic tire spoke, which comprises a thermoplastic polyester elastomer, a silane-based interfacial binder, and silica particles.

Thermoplastic Polyester Elastomer

The thermoplastic polyester elastomer may comprise a polyester block copolymer. The polyester block copolymer may comprise a hard segment (a1) and a soft segment (a2).

The hard segment (a1) may be an aromatic dicarboxylic acid or an ester derivative thereof and a diol or an ester derivative thereof. Specifically, examples of the aromatic dicarboxylic acid include terephthalic acid, isophthalic acid, phthalic acid, naphthalene-2,6-dicarboxylic acid, naphthalene-2,7-dicarboxylic acid, anthracenedicarboxylic acid, diphenyl-4,4'-dicarboxylic acid, diphenoxyethane dicarboxylic acid, 4,4'-diphenyl ether dicarboxylic acid, 5-sulfoisophthalic acid, and 3-sulfoisophthalate sodium salt. In addition, the aromatic dicarboxylic acid may be in part substituted with an alicyclic dicarboxylic acid such as 1,4-cyclohexanedicarboxylic acid, cyclopentanedicarboxylic acid, and 4,4'-dicyclohexyldicarboxylic acid and/or an aliphatic dicarboxylic acid such as adipic acid, succinic acid, oxalic acid, sebacic acid, dodecanedioic acid, and dimer acid.

The diol may be at least one selected from the group consisting of an aliphatic diol such as 1,4-butanediol, ethylene glycol, trimethylene glycol, pentamethylene glycol, hexamethylene glycol, neopentyl glycol, and decamethylene glycol; an alicyclic diol such as 1,1-cyclohexanedimethanol, 1,4-dicyclohexanedimethanol, and tricyclodecanedimethanol; an aromatic diol such as xylylene glycol, bis(p-hydroxy)diphenyl, bis(p-hydroxy)diphenylpropane, 2,2'-bis[4-(2-hydroxyethoxy)phenyl]propane, bis[4-(2-hydroxyethoxy)phenyl] sulfone, 1,1-bis[4-(2-hydroxyethoxy)phenyl]cyclohexane, 4,4'-dihydroxy-p-terphenyl, and 4,4'-dihydroxy-p-quaterphenyl. In addition, the diol may be in the form of an ester derivative thereof as described above, for example, an acetyl body, an alkali metal salt, or the like.

More specifically, the hard segment (a1) may comprise a polybutylene terephthalate unit derived from terephthalic acid and/or dimethyl terephthalate and 1,4-butanediol; and a polybutylene isophthalate unit derived from isophthalic acid and/or dimethyl isophthalate and 1,4-butanediol.

The soft segment (a2) may comprise an aliphatic polyether unit and/or an aliphatic polyester unit and a polycarbonate unit.

Examples of the aliphatic polyether unit may include poly(ethylene oxide) glycol, poly(propylene oxide) glycol, poly(tetramethylene oxide) glycol, poly(hexamethylene oxide) glycol, a copolymer of ethylene oxide and propylene oxide, an ethylene oxide addition polymer of poly(propylene oxide) glycol, and a copolymer of ethylene oxide and tetrahydrofuran.

Examples of the aliphatic polyester unit include poly(ε-caprolactone), polyenantholactone, polycaprylolatone, polybutylene adipate, and polyethylene adipate.

The polycarbonate unit may have a structure represented by the following Formula 3.

[Formula 3]

In the above Formula 3,

R is hydrogen, a $C_{1-3}$ alkyl group, or a $C_{6-10}$ aryl group, and x is an integer of 2 to 20.

Specifically, in the above Formula 3, R may be hydrogen, and x may be 6. That is, the polycarbonate unit may be poly(hexamethylene carbonate).

The thermoplastic polyester elastomer may have a melting point of 120 to 230° C. Specifically, the thermoplastic polyester elastomer may have a melting point of 140 to 220° C.

Silane-Based Interfacial Binder

The silane-based interfacial binder serves to lower the hydrophilicity of the surface of silica particles and to modify it to be hydrophobic, thereby improving the dispersion of the silica particles in the thermoplastic polyester elastomer; to prevent agglomeration of the silica particles to reduce defects in the manufactured product; and to improve the mechanical properties of the manufactured product. In addition, the silane-based interfacial binder may serve to lower the content of silica particles, thereby providing significant advantages in terms of cost as well as the improvements in the mechanical properties.

The silane-based interfacial binder may be a compound represented by the following Formula 1, a compound represented by the following Formula 2, or a combination thereof. Specifically, the silane-based interfacial binder may be a compound represented by the following Formula 1 or a compound represented by the following Formula 2.

[Formula 1]

[Formula 2]

Silica Particles

The silica particles are comprised in the composition to serve to improve the rigidity and elasticity thereof.

The silica particles may have an average particle diameter of 100 to 300 μm. Specifically, the silica particles may have an average particle diameter of 200 to 300 μm or 220 to 280 μm.

The composition may comprise 1 to 18 parts by weight of the silica particles and 0.1 to 2 parts by weight of the silane-based interfacial binder per 100 parts by weight of the thermoplastic polyester elastomer. Specifically, the composition may comprise 2 to 15 parts by weight, 5 to 15 parts by weight, or 5 to 10 parts by weight of the silica particles; and 0.2 to 1.5 parts by weight, 0.5 to 1.5 parts by weight, or 0.5 to 1.0 parts by weight of the silane-based interfacial binder, per 100 parts by weight of the thermoplastic polyester elastomer.

Non-Pneumatic Tire Spoke

In addition, the present invention provides a non-pneumatic tire spoke prepared from the composition. The non-pneumatic tire spoke may be in the form in which silica particles are uniformly dispersed in a thermoplastic polyester elastomer (see FIG. 7). Uniform dispersion of the silica particles as described above produces the effect of improving the mechanical properties of the non-pneumatic tire spoke and reducing the defects of the manufactured product.

The non-pneumatic tire spoke may have a tensile modulus of 50 to 200 MPa and a flexural modulus of 90 to 200 MPa. Specifically, the non-pneumatic tire spoke may have a tensile modulus of 80 to 180 MPa and a flexural modulus of 95 to 170 MPa.

Since the non-pneumatic tire spoke is excellent in such mechanical properties as tensile modulus, flexural modulus, and the like, it is suitable for a non-pneumatic tire spoke for high-speed driving. Specifically, the non-pneumatic tire spoke may be for industrial, military, or high-speed passenger vehicles. The industrial non-pneumatic tire spoke may be for construction machinery or transportation.

Process for Manufacturing a Non-Pneumatic Tire Spoke

Further, the present invention provides a process for manufacturing a non-pneumatic tire spoke, which comprises mixing a thermoplastic polyester elastomer, a silane-based interfacial binder, and silica particles to prepare a mixture; and molding the mixture.

Step of Preparing a Mixture

The thermoplastic polyester elastomer, the silica particles, and the silane-based interfacial binder are as described above in the composition for a non-pneumatic tire spoke, respectively.

The mixture may comprise 1 to 18 parts by weight of the silica particles and 0.1 to 2 parts by weight of the silane-based interfacial binder per 100 parts by weight of the thermoplastic polyester elastomer. Specifically, the mixture may comprise 2 to 15 parts by weight of the silica particles; and 0.2 to 1.5 parts by weight of the silane-based interfacial binder per 100 parts by weight of the thermoplastic polyester elastomer.

The mixing may be carried out at 190 to 220° C. at a speed of 60 to 70 rpm for 5 to 10 minutes. Specifically, the mixing may be carried out at 200 to 210° C. at a speed of 65 to 70 rpm for 6 to 7 minutes.

Step of Molding

The molding may be carried out by putting the mixture obtained through the mixing step into a mold at 200 to 220° C. and molding it, followed by cooling it at room temperature. Specifically, the molding may be carried out by putting the mixture into a mold at 200 to 210° C. and molding it, followed by cooling it at 20 to 25° C. for 5 to 10 seconds.

MODE FOR THE INVENTION

The manufacturers and product names of the compounds used in the following Examples and Comparative Examples are shown below.

Thermoplastic polyester elastomer (TPEE): KOPEL® KP3340 of Kolon

Silica particles 1: ZEOSIL 200MP of Solvay (hereinafter referred to as "M") (average particle diameter: 250 μm)

Silica particles 2: Z115GR of Rhodia (hereinafter referred to as "Z") (average particle diameter: 100 μm)

Nanoclay 1: nanoclay Cloisite Na+ of Nanokor (hereinafter referred to as "Na") (average particle diameter: 13 nm)

Nanoclay 2: nanoclay Cloisite 15A of Nanokor (hereinafter referred to as "15A") (average particle diameter: 13 nm)

Carbon fiber: 719781 of Sigma-Aldrich (diameter: 100 nm, length: 20 to 200 μm)

Silane-based interfacial binder S: NXT of Momentive (Formula 1 below)

[Formula 1]

Silane-based interfacial binder N: Si-69 of Evonik (Formula 2 below)

[Formula 2]

EXAMPLE 1

Preparation of a Composition for a Non-Pneumatic Tire Spoke

A Brabender heated to 210° C. was charged with 100 parts by weight of the thermoplastic polyester elastomer and 2 parts by weight of the silica particles 2. It was stirred for 7 minutes while 0.2 parts by weight of the silane-based interfacial binder S (in liquid phase) was slowly added thereto using a glass pipette, thereby preparing a composition for a non-pneumatic tire spoke.

EXAMPLES 2 to 12

Each composition for a non-pneumatic tire spoke was prepared in the same manner as in Example 1 except that the content and type of the silica particles and the type and content of the silane-based interfacial binder were changed as shown in Table 1 below.

COMPARATIVE EXAMPLE 1

Only the thermoplastic polyester elastomer was used without the use of the silica particles and the silane-based interfacial binder.

COMPARATIVE EXAMPLES 2 TO 6

Each composition was prepared in the same manner as in Example 1, except that nanoclay was used instead of the silica particles without the use of the silane-based interfacial binder.

COMPARATIVE EXAMPLES 7 AND 8

Each composition was prepared in the same manner as in Example 1, except that the content of the silica particles was changed as shown in Table 1 without the use of the silane-based interfacial binder.

TABLE 1

| | Particles | | Silane-based interfacial binder | |
|---|---|---|---|---|
| | Type | Content (part by weight) | Type | Content (part by weight) |
| Example 1 | Silica particles 2 | 2 | Silane-based interfacial binder S | 0.2 |
| Example 2 | Silica particles 2 | 4 | Silane-based interfacial binder S | 0.4 |
| Example 3 | Silica particles 2 | 6 | Silane-based interfacial binder S | 0.6 |
| Example 4 | Silica particles 2 | 10 | Silane-based interfacial binder S | 1.0 |
| Example 5 | Silica particles 2 | 15 | Silane-based interfacial binder S | 1.5 |
| Example 6 | Silica particles 2 | 2 | Silane-based interfacial binder N | 0.2 |
| Example 7 | Silica particles 2 | 4 | Silane-based interfacial binder N | 0.4 |
| Example 8 | Silica particles 2 | 6 | Silane-based interfacial binder N | 0.6 |
| Example 9 | Silica particles 2 | 8 | Silane-based interfacial binder N | 0.8 |
| Example 10 | Silica particles 2 | 10 | Silane-based interfacial binder N | 1.0 |
| Example 11 | Silica particles 2 | 15 | Silane-based interfacial binder N | 1.5 |
| Example 12 | Silica particles 2 | 20 | Silane-based interfacial binder N | 2.0 |
| Comp. Example 1 | — | — | — | — |
| Comp. Example 2 | Nanoclay 2 | 5 | — | — |
| Comp. Example 3 | Nanoclay 2 | 10 | — | — |
| Comp. Example 4 | Nanoclay 2 | 20 | — | — |
| Comp. Example 5 | Nanoclay 1 | 10 | — | — |
| Comp. Example 6 | Nanoclay 1 | 20 | — | — |
| Comp. Example 7 | Silica particles 2 | 10 | — | — |
| Comp. Example 8 | Silica particles 2 | 20 | — | — |

TEST EXAMPLE 1

Measurement of Physical Properties

Figure 1:
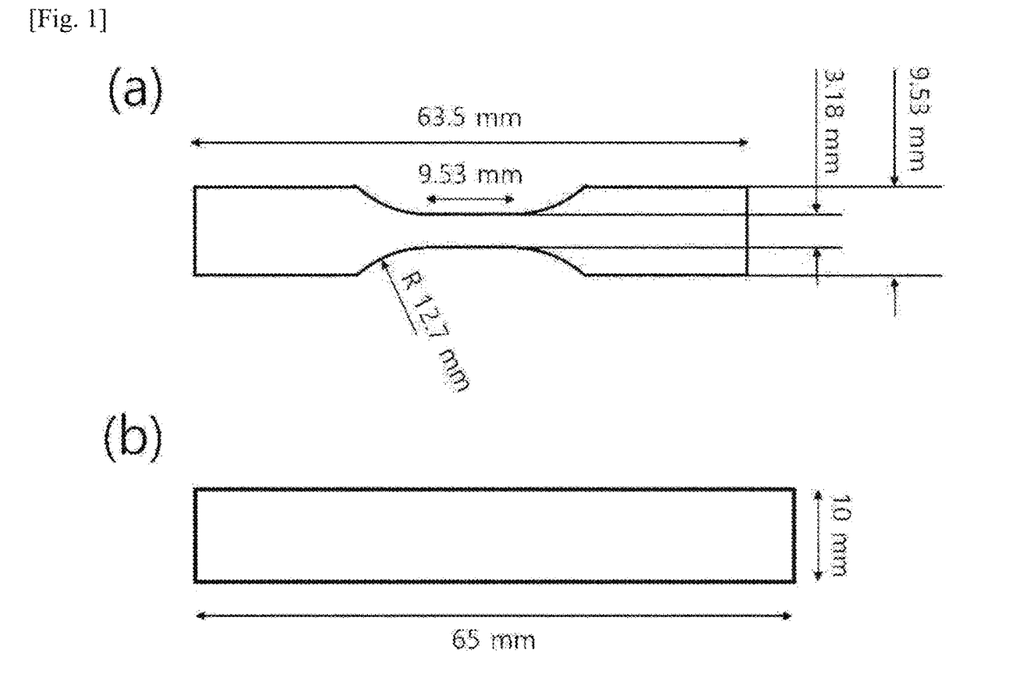
FIG. 1 is a schematic diagram of a specimen prepared for measuring mechanical properties in Test Example 1, in which (a) is a specimen for measuring tensile modulus, and (b) is a specimen for measuring flexural modulus.

The compositions of Examples 1 to 12 and Comparative Examples 1 to 8 were each injected into a specimen maker heated to 200° C. to be molten, cast into a mold (i.e., casting mold), and then cooled, thereby preparing a specimen as shown in FIGS. 1(a) and (b). In FIG. 1, (a) is a specimen for measuring the tensile modulus, and (b) is a specimen for measuring the flexural modulus. In such event, the thickness of the specimen for measuring the tensile modulus and the specimen for measuring the elastic modulus was 3 mm.

The specimens prepared as described above were each subjected to measurements for the physical properties in the following manner. The results are shown in FIGS. 2 to 7 and Table 2.

(1) Tensile Modulus

Tensile modulus was evaluated according to the test conditions specified in ISO 527. The specimen thus prepared (FIG. 1 (a)) was left at room temperature for 48 hours. The specimen was clamped in the tension test grip of a universal test machine (UTM) and tensioned at a constant speed until break under an elongation measuring mode. The value at break was recorded.

(2) Flexural Modulus

Flexural modulus was evaluated according to the test conditions specified in ISO 178. The specimen thus prepared (FIG. 1 (b)) was left at room temperature for 48 hours. The specimen was placed on the bending test jig of a universal test machine (UTM), and the test machine was run in the specimen direction at a constant speed to record the flexural modulus of the specimen.

TABLE 2

| | Content of silica particles (part by weight) | Content of silane-based interface binder (part by weight) | Tensile modulus (MPa) | Flexural modulus (MPa) |
|---|---|---|---|---|
| Comparative Example 1 | — | — | 83.47 | 106.0 |
| Example 6 | 2 | 0.2 | 89.80 | 102.70 |
| Example 7 | 4 | 0.4 | 104.45 | 99.40 |
| Example 8 | 6 | 0.6 | 100.75 | 113.0 |
| Example 9 | 8 | 0.8 | 105.44 | 122.8 |
| Example 10 | 10 | 1.0 | 151.67 | 140.1 |
| Example 11 | 15 | 1.5 | 171.54 | 167.8 |
| Example 12 | 20 | 2.0 | 171.54 | 167.8 |
| Comparative Example 7 | 10 | — | 74.33 | 130.4 |
| Comparative Example 8 | 20 | — | 88.48 | 182.8 |

Figure 2:
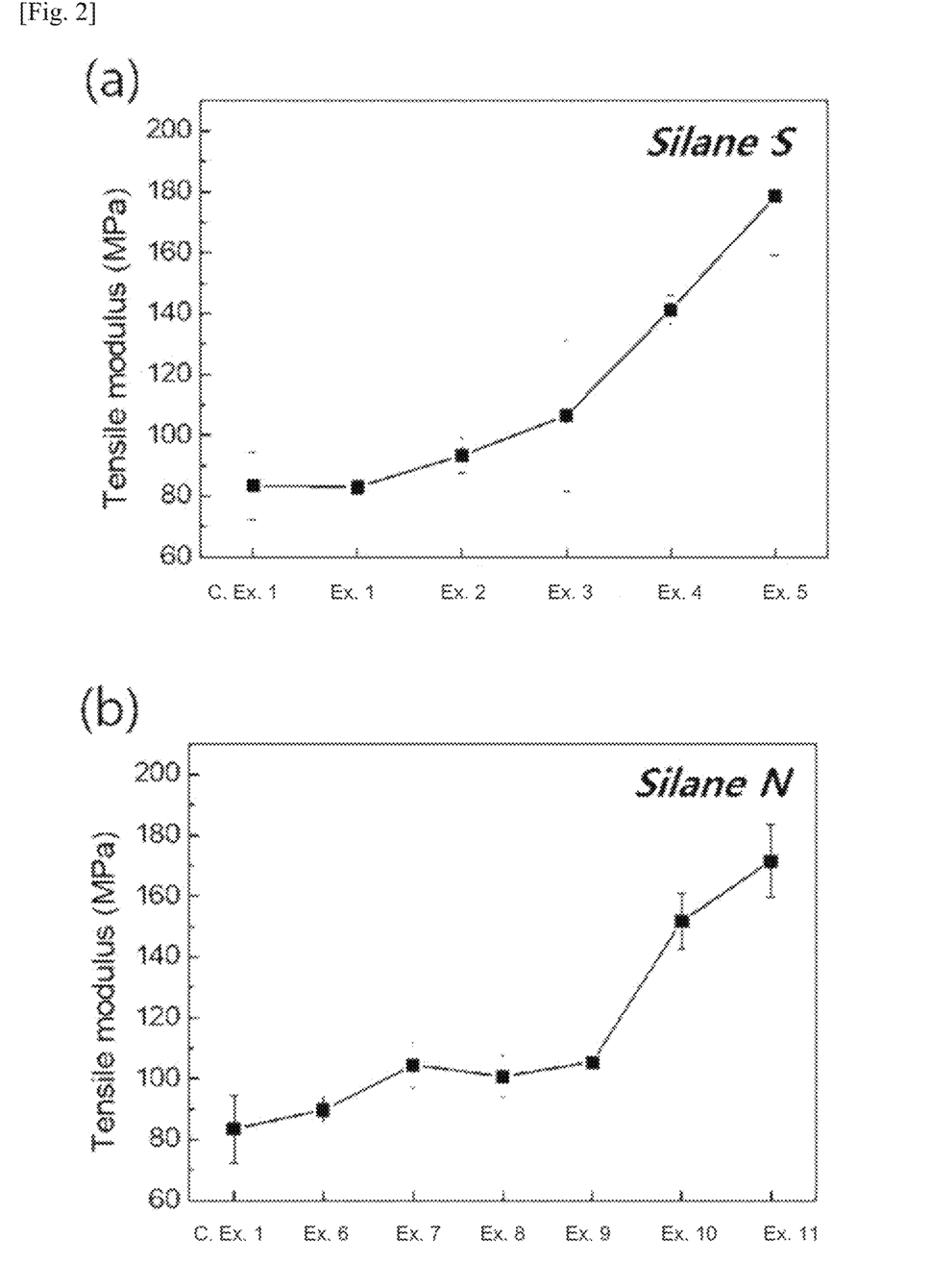
FIG. 2 shows the results of measuring the tensile modulus of specimens obtained from the compositions prepared in Examples 1 to 11 and Comparative Example 1.

As shown in FIG. 2 and Table 2, the tensile modulus of the specimens of Examples 1 to 11, which comprised the silica particles and the silane-based interfacial binder, increased in proportion to the increase in the content of the silica particles and the silane-based interfacial binder. This indicates that the silica particles increase the tensile modulus, which means that the silica particles produce an effect of improving the rigidity of the material in the thermoplastic resin.

In particular, the specimens of Examples 5 and 11, which comprised 15 parts by weight of the silica particles, had a high tensile modulus of at least 170 MPa, which was similar when the types of the silane-based interfacial binder were different. Meanwhile, Comparative Example 1 without the silica particles showed the lowest tensile modulus of 83.47 MPa, which is similar to that of the conventional materials for non-pneumatic tire spokes.

Figure 3:
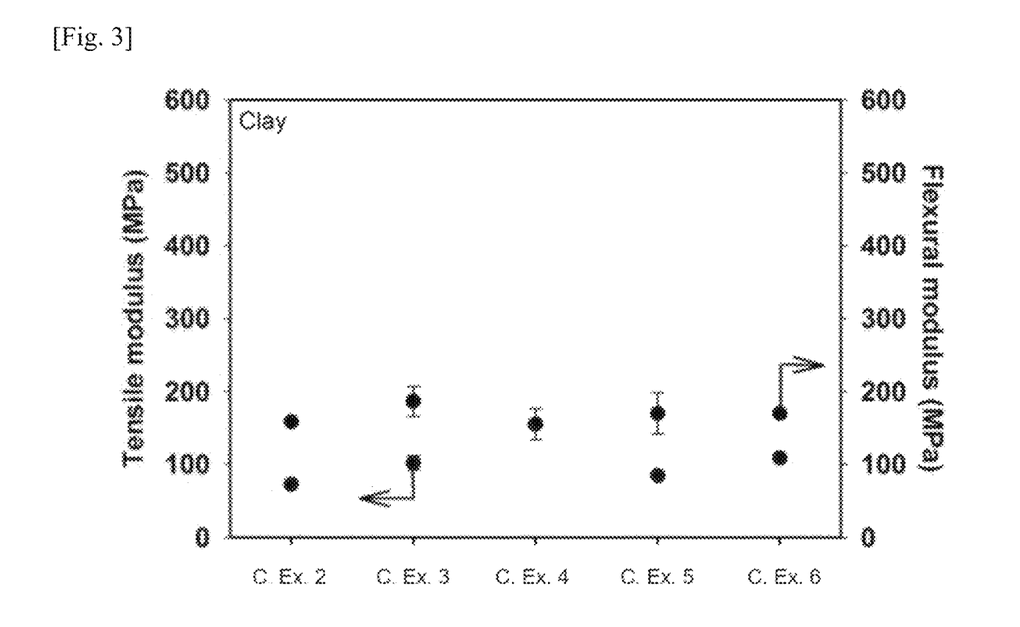
FIG. 3 shows the result of measuring the tensile modulus and flexural modulus with respect to the type and content of silica particles.

As shown in FIG. 3, the tensile modulus of the specimen of Comparative Example 2, which comprised nanoclay (15A), had a tensile modulus of about 72 MPa, which is about 14% lower than that of Comparative Example 1, which comprised the thermoplastic resin only. In addition, as the content of nanoclay increased to 10 to 20 parts by weight, the tensile modulus of the specimens also increased to 98 MPa and 161 MPa, respectively. Further, the tensile modulus of Comparative Examples 5 and 6, which comprised nanoclay (Na), also increased to 85 MPa and 108 MPa, respectively.

Figure 4:
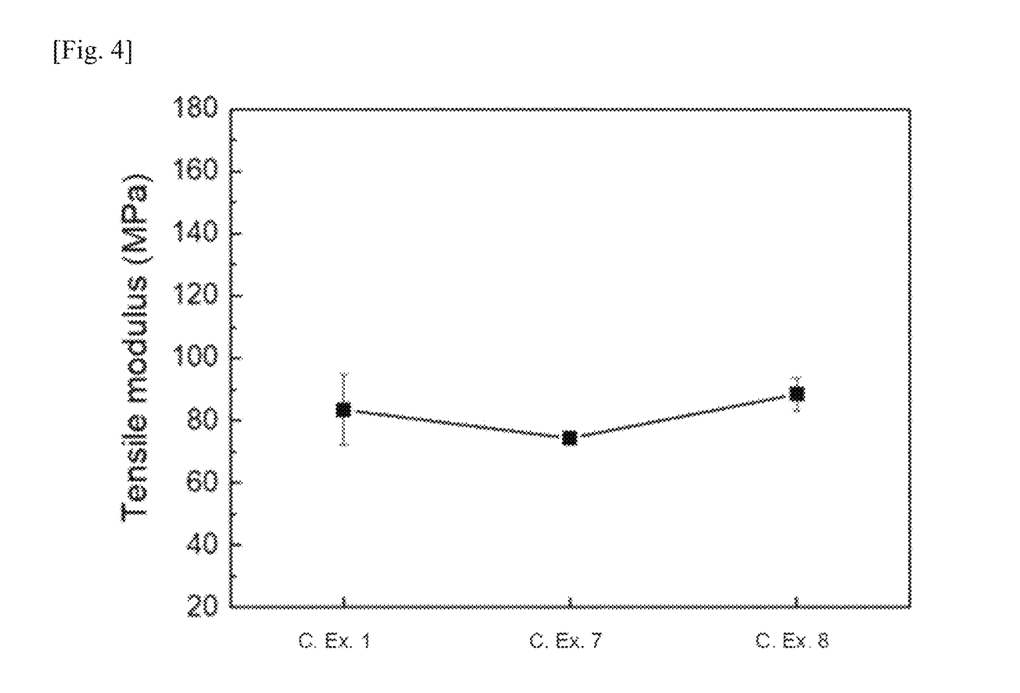
FIG. 4 is a graph showing the changes in tensile modulus with respect to the content of silica particles.

As shown in FIG. 4, the tensile modulus of the specimens of Comparative Examples 7 and 8, which comprised the silica particles only without the use of the silane-based interfacial binder, was 74 MPa and 88 MPa, respectively, as similar to 83 MPa of Comparative Example 1, which comprised the thermoplastic resin only. It was found from the above that the silane-based interfacial binder is important for controlling the physical properties of the composition.

Figure 5:
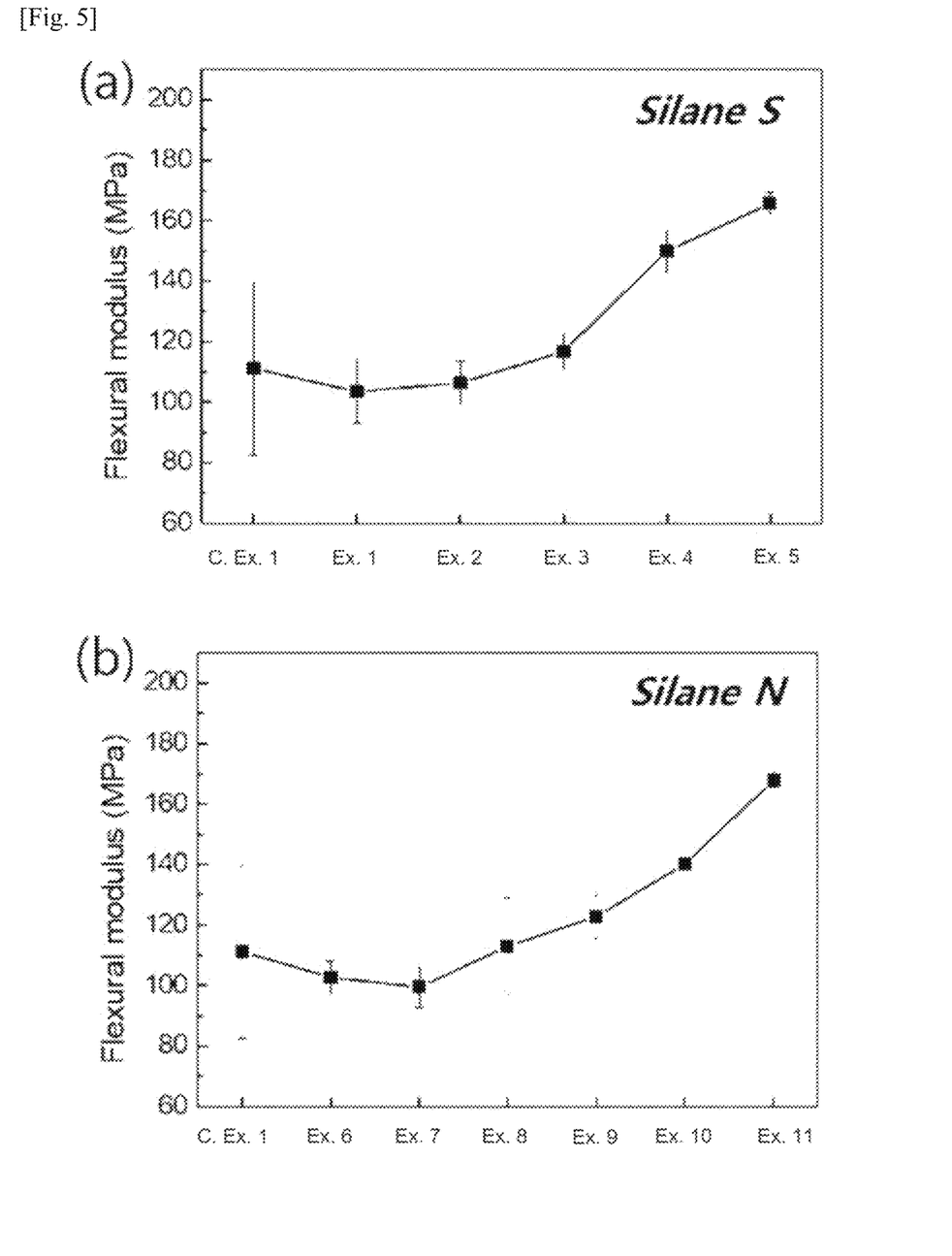
FIG. 5 shows the results of measuring the flexural modulus of specimens obtained from the compositions prepared in Examples 1 to 11 and Comparative Example 1.

As shown in FIG. 5 and Table 2, the flexural modulus of the specimens of Examples 2 to 5 and 8 to 11, which comprised the silica particles and the silane-based interfacial binder, increased in proportion to the increase in the content of the silica particles. However, the flexural modulus of Examples 1, 6, and 7, which comprised a small amount of the silica particles, was slightly smaller than, or similar to, that of Comparative Example 1 without the silica particles within the measurement error ranges. This means that the silica particles produce an effect of improving the rigidity of the material in the thermoplastic resin as in the measurements of tensile modulus.

In particular, the specimens of Examples 5 and 11, which comprised 15 parts by weight of the silica particles, had a high flexural modulus of about 165 MPa, which was similar when the types of the silane-based interfacial binder were different. Meanwhile, Comparative Example 1 without the silica particles and the silane-based interface binder showed low flexural modulus of 106 MPa, which is similar to that of the conventional materials for non-pneumatic tire spokes.

In addition, as shown in FIG. 3, the flexural modulus of the specimens of Comparative Examples 2 and 3, which comprised nanoclay (15A), had a flexural modulus of 159 MPa and 178 MPa, which are improved by about 50% and 68%, respectively, as compared with 106 MPa of Comparative Example 1, which comprised the thermoplastic resin only. Further, the flexural modulus of Comparative Examples 5 and 6, which comprised nanoclay (Na), had a flexural modulus of 158 MPa and 167 MPa, which are improved by about 49% and 58%, respectively, as compared with Comparative Example 1 without the silica particles and the silane-based interface binder. Furthermore, even the addition of a small amount of nanoclay increased the rigidity of the prepared specimens very much. Thus, nanoclay is not suitable for use as a filler for the composition for non-pneumatic tire spokes.

Figure 6:
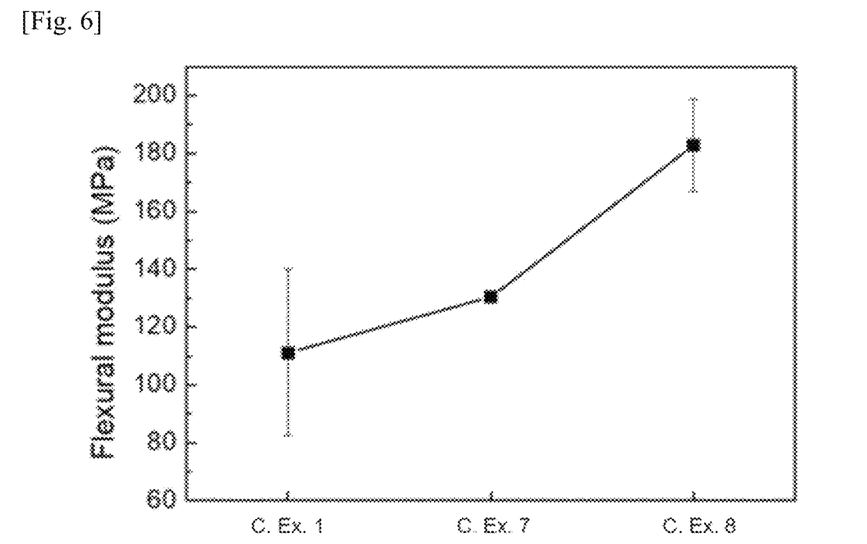
FIG. 6 is a graph showing the changes in flexural modulus with respect to the content of silica particles.

As shown in FIG. 6, the flexural modulus of the specimens of Comparative Examples 7 and 8, which comprised the silica particles only, was 130 MPa and 182 MPa, respectively. This was a value that is higher than the flexural modulus of 106 MPa of the specimen of Comparative Example 1 without the silica particles.

In addition, as shown in Table 2, the tensile modulus and the flexural modulus of Example 11, which comprised 15 parts by weight of the silica particles, were similar to those of Example 12, which comprised 20 parts by weight of the silica particles. It was found from the above that more than 15 parts by weight of the silica particles was not effective in improving the physical properties of the composition.

(3) Measurement of Dispersity

Figure 7:
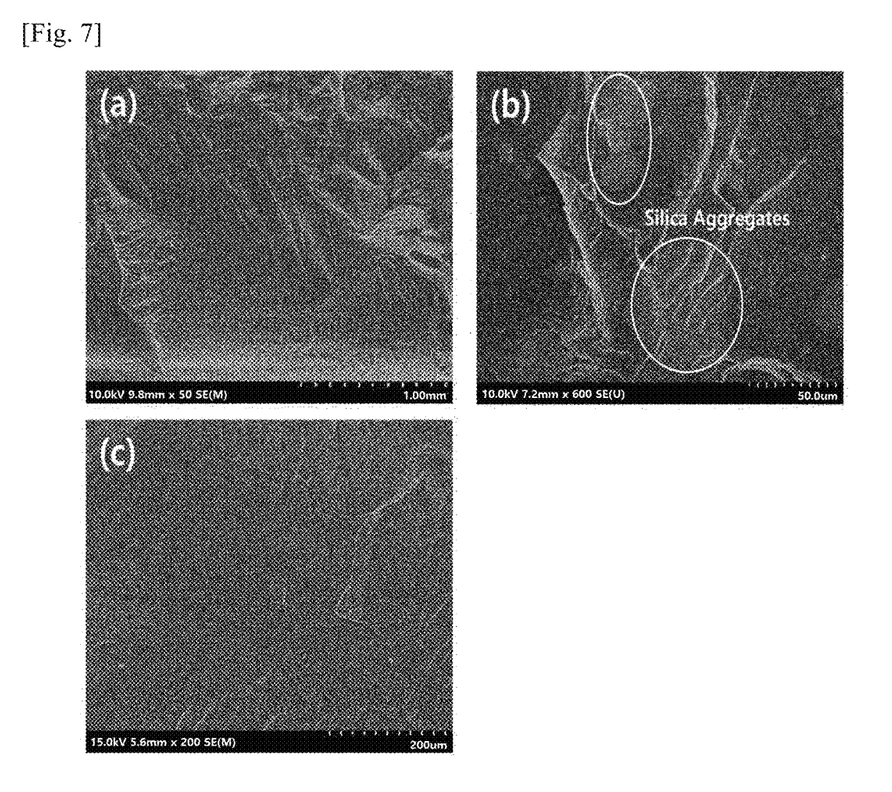
FIG. 7 shows scanning electron microscope pictures of a cross-section of a specimen obtained from the compositions prepared in Comparative Example 1, Comparative Example 8, and Example 12 ((a): Comparative Example 1, (b): Comparative Example 8, and (c): Example 12).

In order to determine the dispersity of the silica particles in the thermoplastic polyester elastomer, a cross-section of the specimen was observed with a scanning electron microscope, and the results are shown in FIG. 7.

FIG. 7(a) shows a cross-section of the specimen of Comparative Example 1, which did not comprise the silica particles. The shape of any particles was not observed, and the cross-section was uniform.

FIG. 7(b) shows a cross-section of the specimen of Comparative Example 8, which comprised the silica particles without the use of the silane-based interface binder. Unlike FIG. 7(a), aggregation of white silica particles was observed in some parts. This is a phenomenon caused by the low affinity with the thermoplastic polyester elastomer due to the hydrophilicity of the hydroxy group (—OH) on the surface of the silica particles. Such partial aggregation of the silica particles may not only reduce the uniformity of the specimen, but also may lower the mechanical properties.

FIG. 7(c) shows a cross-section of the specimen of Example 12. Unlike FIG. 7(b), the aggregation phenomenon was remarkably reduced despite the presence of the silica particles. This indicates that the surface of the silica particles was hydrophobically modified by the reaction of the silane-based interfacial binder with the silica particles, thereby increasing the affinity between the thermoplastic polyester elastomer and the silica particles, which increases the dispersibility thereof in the resin.

COMPARATIVE EXAMPLES 9 TO 13: PREPARATION OF A COMPOSITION COMPRISING A CARBON FIBER

Each composition was prepared in the same manner as in Example 1, except that a carbon fiber was used instead of the silica particles in the amounts shown in Table 3, and no silane-based interfacial binder was used.

TABLE 3

|  | Content of carbon fiber (part by weight) |
| --- | --- |
| Comparative Example 9 | 10 |
| Comparative Example 10 | 15 |
| Comparative Example 11 | 20 |
| Comparative Example 12 | 25 |
| Comparative Example 13 | 30 |

TEST EXAMPLE 2

Figure 8:
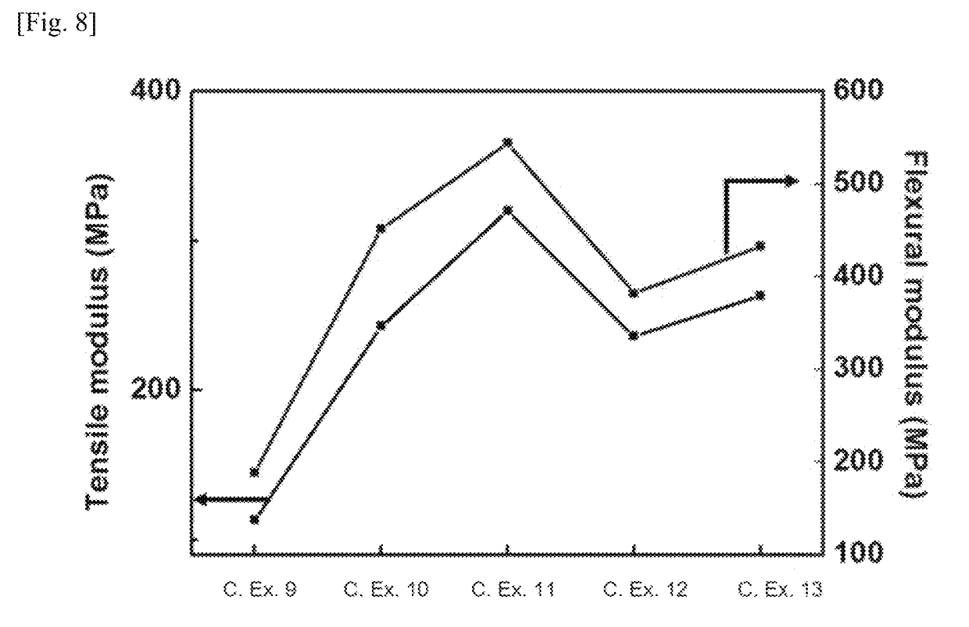
FIG. 8 shows the results of measuring the tensile modulus and flexural modulus of specimens obtained from the compositions prepared in Comparative Examples 9 to 13.

Specimens were prepared from the compositions of Comparative Examples 9 to 11 in the same manner as in Test Example 1 to measure the tensile modulus and flexural modulus in the same manner as in Test Example 1, and the results are shown in FIG. 8.

As shown in FIG. 8, Comparative Example 9, in which 10 parts by weight of a carbon fiber was used, showed a tensile modulus of 113 MPa, which was increased by 36% as compared with Comparative Example 1, which was made of a thermoplastic polyester elastomer. In addition, as the content of the carbon fiber increased to 15 parts by weight, 20 parts by weight, 25 parts by weight, and 30 parts by weight, the tensile modulus increased to 243 MPa, 320 MPa, 236 MPa, and 263 MPa, and then decreased. Specifically, the mechanical properties of the specimens were improved until the carbon fiber content increased to 20 parts by weight, but then decreased as the content exceeded 20 parts by weight. This is because when the content of the carbon fiber exceeds 20 parts by weight, the dispersibility of the carbon fiber in the thermoplastic polyester elastomer is lowered, whereby the filling effect is reduced.

Furthermore, when the content of the carbon fiber was increased to 20 parts by weight, the flexural modulus was greatly improved as similar to the tensile modulus. But the flexural modulus decreased as well when the content of the carbon fiber exceeded 20 parts by weight. This is believed to be a problem caused by the nonuniform dispersion of the carbon fiber in the thermoplastic polyester elastomer as the carbon fiber content increases when the carbon fiber forms a composite with thermoplastic polyester elastomer. In addition, even the addition of a small amount of carbon fiber increased the rigidity of the prepared specimens very much. Thus, a carbon fiber is not suitable for use as a filler for the composition for non-pneumatic tire spokes.

The invention claimed is:

1. A composition for a non-pneumatic tire spoke, which comprises a thermoplastic polyester elastomer, a silane-based interfacial binder, and silica particles,
    wherein the thermoplastic polyester elastomer comprises a polyester block copolymer which comprises a hard segment (a1) and a soft segment (a2),
    wherein the hard segment (a1) comprises 1) an aromatic dicarboxylic acid or an ester derivative thereof, and 2) a diol or an ester derivative thereof,
    wherein the soft segment (a2) comprises 1) a polycarbonate unit and 2) an aliphatic polyether unit and/or an aliphatic polyester unit, and
    wherein the composition comprises 5 to 15 parts by weight of the silica particles and 0.5 to 1.5 parts by weight of the silane-based interfacial binder per 100 parts by weight of the thermoplastic polyester elastomer.

2. The composition for a non-pneumatic tire spoke of claim 1, wherein the silica particles have an average particle diameter of 100 to 300 μm.

3. The composition for a non-pneumatic tire spoke of claim 1, wherein the silane-based interfacial binder is a compound represented by the following Formula 1, a compound represented by the following Formula 2, or a combination thereof:

[Formula 1]

[Formula 2]

4. A non-pneumatic tire spoke comprising the composition of claim 1.

5. The non-pneumatic tire spoke of claim 4, which has a tensile modulus of 50 to 200 MPa and a flexural modulus of 90 to 200 MPa.

6. A process for manufacturing a non-pneumatic tire spoke, the process comprising:
    mixing a thermoplastic polyester elastomer, a silane-based interfacial binder, and silica particles to prepare a mixture; and
    molding the mixture,
    wherein the thermoplastic polyester elastomer comprises a polyester block copolymer which comprises a hard segment (a1) and a soft segment (a2),
    wherein the hard segment (a1) comprises 1) an aromatic dicarboxylic acid or an ester derivative thereof, and 2) a diol or an ester derivative thereof,
    wherein the soft segment (a2) comprises 1) a polycarbonate unit and 2) an aliphatic polyether unit and/or an aliphatic polyester unit, and
    wherein the mixture comprises 5 to 15 parts by weight of the silica particles and 0.5 to 1.5 parts by weight of the silane-based interfacial binder per 100 parts by weight of the thermoplastic polyester elastomer.

7. The process for manufacturing a non-pneumatic tire spoke of claim 6, wherein the mixing is carried out at 190 to 220° C. at a speed of 60 to 70 rpm for 5 to 10 minutes.

* * * * *